(12) United States Patent
Toth et al.

(10) Patent No.: US 9,783,113 B2
(45) Date of Patent: Oct. 10, 2017

(54) REMOVABLE SIDE VIEW MIRROR FOR VEHICLE

(71) Applicant: Waymo LLC, Mountain View, CA (US)

(72) Inventors: Kimberly Geneva Toth, Palo Alto, CA (US); Justin Matthew Andrade, San Jose, CA (US); Christopher John Stoffel, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/156,955

(22) Filed: May 17, 2016

(65) Prior Publication Data

US 2016/0368419 A1    Dec. 22, 2016

Related U.S. Application Data

(60) Provisional application No. 62/182,181, filed on Jun. 19, 2015.

(51) Int. Cl.
| | |
|---|---|
| *B60R 1/06* | (2006.01) |
| *B60R 1/00* | (2006.01) |
| *B60R 1/078* | (2006.01) |

(52) U.S. Cl.
CPC ............. *B60R 1/006* (2013.01); *B60R 1/06* (2013.01); *B60R 1/078* (2013.01)

(58) Field of Classification Search
CPC ............ B60R 1/006; B60R 1/06; B60R 1/078
USPC .......................................... 359/841; 248/467
See application file for complete search history.

(56) References Cited

U.S. PATENT DOCUMENTS

| | | | | |
|---|---|---|---|---|
| 2,128,187 A | * | 8/1938 | Kondrath | B60R 1/06 16/223 |
| 2,690,094 A | * | 9/1954 | Becker | B60Q 1/30 248/298.1 |
| 2,856,814 A | * | 10/1958 | Dillmann | B60R 1/06 248/205.6 |
| 3,114,530 A | | 12/1963 | Shilling | |
| 3,142,469 A | | 7/1964 | Clemmer | |
| 3,166,283 A | | 1/1965 | Farnsworth | |
| 3,228,643 A | * | 1/1966 | Shilling | B60R 1/078 248/271 |
| 3,260,490 A | | 7/1966 | Trautner | |

(Continued)

FOREIGN PATENT DOCUMENTS

| | | |
|---|---|---|
| DE | 2726446 A1 | 12/1978 |
| JP | 2003252115 A | 9/2003 |

OTHER PUBLICATIONS

International Search Report and Written Opinion for PCT Application No. PCT/US2016/035023, dated Aug. 25, 2016.

(Continued)

*Primary Examiner* — Ricky D Shafer
(74) *Attorney, Agent, or Firm* — Lerner, David, Littenberg, Krumholz & Mentlik, LLP

(57) ABSTRACT

A side view mirror assembly includes a retention mechanism, a securing mechanism, and a reflective surface. The retention mechanism may be configured to engage at least a portion of a windowsill of a vehicle. The securing mechanism may be connected to the retention mechanism and configured to removably secure the mirror assembly to a surface of the vehicle. The reflective surface may be connected to the retention mechanism.

20 Claims, 10 Drawing Sheets

(56) References Cited

U.S. PATENT DOCUMENTS

| | | | |
|---|---|---|---|
| 3,294,438 A | | 12/1966 | Carson, Jr. et al. |
| 3,395,883 A | * | 8/1968 | Murgas .................. B60R 1/078 |
| | | | 248/229.1 |
| 4,158,451 A | * | 6/1979 | Lukey .................... B60R 1/078 |
| | | | 248/479 |
| 4,896,954 A | * | 1/1990 | Swanson .................. B60R 1/06 |
| | | | 248/467 |
| 5,438,457 A | * | 8/1995 | Moore .................... B60R 1/006 |
| | | | 248/467 |
| 5,482,310 A | * | 1/1996 | Staggs ..................... B60D 1/36 |
| | | | 248/467 |
| 5,639,134 A | * | 6/1997 | Rusch .................. B25B 11/007 |
| | | | 294/187 |
| 5,825,564 A | | 10/1998 | Mazarac |
| 8,973,881 B2 | | 3/2015 | Mihajlovic |
| 9,221,397 B1 | | 12/2015 | Kim et al. |
| 2007/0263301 A1 | | 11/2007 | Agrest |
| 2011/0157730 A1 | | 6/2011 | Lewis |

OTHER PUBLICATIONS

"Towing mirrors for caravans, trailers, boats rear view cameras", Ora Products, © 2014, <http://www.oraproducts.com.au/enzo.htm>.

Projects.magnetic-car-mirror - sleepygeek.org, 5 pages, printed Sep. 5, 2014, <http://sleepygeek.org/projects.magnetic-car-mirror>.

\* cited by examiner

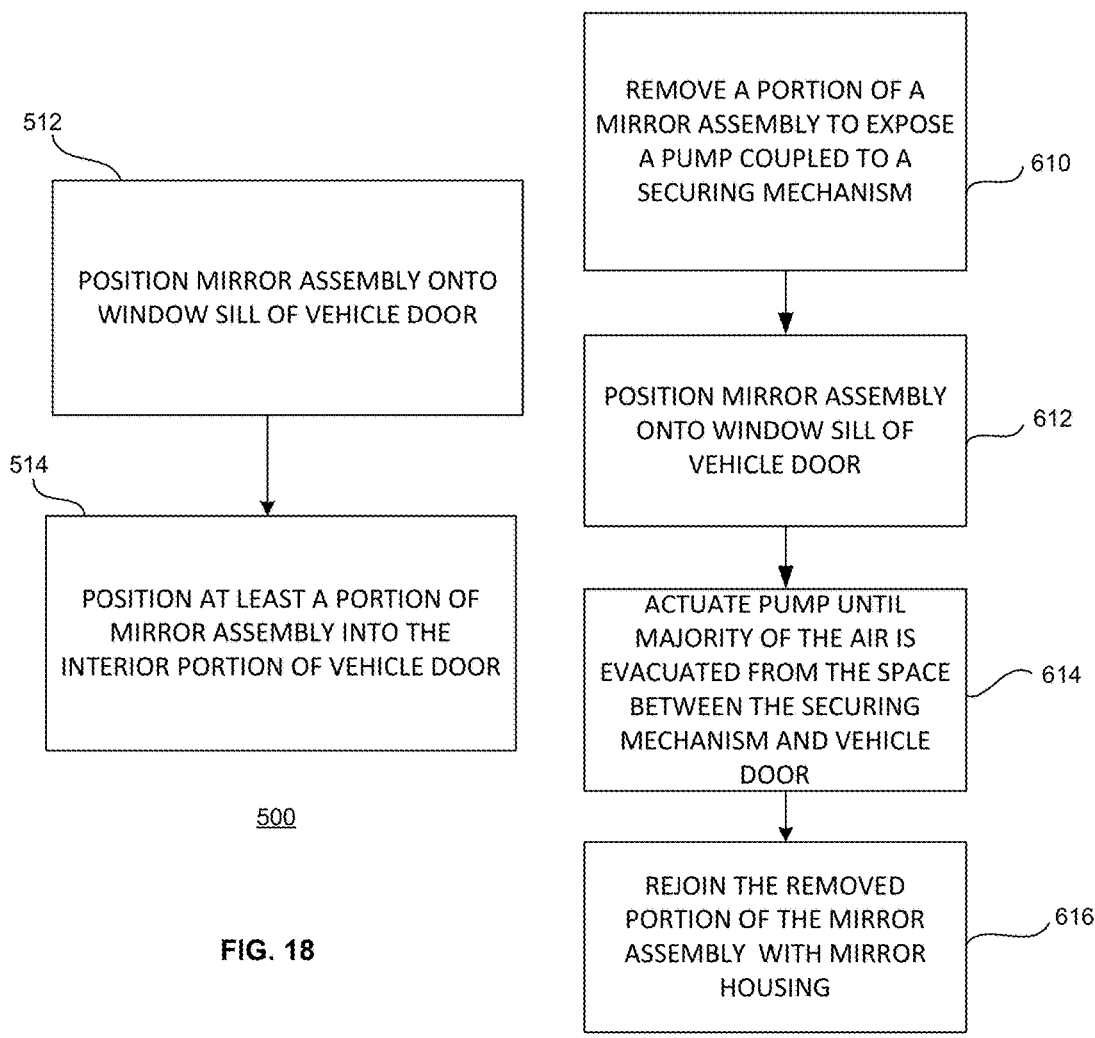

REMOVABLE SIDE VIEW MIRROR FOR VEHICLE

CROSS-REFERENCES TO RELATED APPLICATIONS

The present application claims the benefit of the filing date of U.S. Provisional Application No. 62/182,181, filed Jun. 19, 2015, entitled REMOVABLE SIDE VIEW MIRROR FOR VEHICLE, the disclosure of which is hereby incorporated herein by reference.

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc. As an example, these systems may include sensors, such as laser scanning equipment and cameras, mounted at various locations on the vehicle.

Autonomous vehicles may also operate in a partially or fully autonomous mode. In some instances, a passenger may desire to take over control of the vehicle during heavy traffic or conditions where a passenger would prefer to drive. A human driver may also desire to manually control the vehicle to conduct road testing and maintenance checks on the vehicle.

An autonomous vehicle operating in a fully autonomous mode does not require the same features required by a human driver. For example, when the autonomous vehicle is in full autonomous mode, laser scanning equipment, cameras, and the autonomous vehicle control system control the path of the vehicle, obviating the need for front and rear-side view mirrors and a steering wheel. However, a human driver operating the autonomous vehicle requires such features to operate the autonomous vehicle, for example, in a manual or semiautonomous mode.

BRIEF SUMMARY

Aspects of the disclosure are directed to a removable side view mirror assembly that can be attached to an autonomous vehicle, and easily detached when the autonomous vehicle is operating in fully autonomous mode. For example, when driven by a human driver, the removable side view mirror can be attached; and when the autonomous vehicle operates in a fully autonomous mode, the side view mirror assembly may be detached. Additional aspects of the disclosure include methods for attaching and detaching the side view mirror assembly.

According to one aspect of the disclosure, a side view mirror assembly includes a retention mechanism, a securing mechanism, and a reflective surface. The retention mechanism may be configured to engage at least a portion of a windowsill of a vehicle. The securing mechanism may be connected to the retention mechanism and may be configured to removably secure the mirror assembly to a surface of the vehicle. The reflective surface may be connected to the retention mechanism.

In one example of this aspect, the retention mechanism includes a bracket that has a first leg, a second leg, and a panel joining the first leg and the second leg. The bracket may be configured to receive the at least a portion of the windowsill between the first and second legs. The assembly may further include an arm that has a first end and a second end. The bracket may be connected to the first end and the reflective surface may be connected to the second end.

In another example of this aspect, one of the first and second legs may be positioned adjacent to a window of the vehicle. The assembly may further include a material attached to one of the first and second legs, so as to reduce any damage to the window of the vehicle.

In another example of this aspect, the first leg may be longer than the second leg.

In still another example of this aspect, the securing mechanism includes a suction cup. The securing mechanism may further include a pump in communication with the suction cup. The pump can be configured to evacuate air from a space between the suction cup and the surface.

In another example of this aspect, the securing mechanism includes a magnet positioned on the bracket.

According to another aspect of the disclosure, a side view mirror assembly for a vehicle includes a retention mechanism configured to removably attach the mirror assembly to the windowsill without tools, and a reflective surface.

In one example of this aspect, the retention mechanism may include a bracket. In another example, a securing mechanism may be attached to the retention mechanism and may be configured to secure the mirror assembly to the windowsill. For example, the securing mechanism may include a suction cup. The securing mechanism may further include a pump coupled to the suction cup.

In another example of this aspect, an arm may extend away from the retention mechanism. The arm may support a mirror of the mirror assembly.

Another aspect of the disclosure is directed to a method for installing a side view mirror assembly to a vehicle door. The method includes positioning at least a portion of a side view mirror assembly on an exterior surface of the vehicle door; attaching a removable mechanism supporting a mirror of the mirror assembly to a windowsill of a vehicle door without tools; and securing the mechanism to the vehicle door, such that the mirror assembly remains in place when the vehicle is in motion.

In one example of this aspect, a first leg of a mounting bracket may support the mirror within an opening of a windowsill of the vehicle door and a second leg of the mounting bracket on an exterior surface of the vehicle door.

According to an example of this aspect, the method further includes contacting a surface of the vehicle door with a suction cup attached to the mounting bracket. Air may be further evacuated from a space between the suction cup and vehicle door.

In another example of this aspect, the method further includes releasing the securing mechanism from the door in order to remove the mirror assembly from the door without causing damage to the vehicle.

BRIEF DESCRIPTION OF THE DRAWINGS

FIG. 18 is an example flow diagram according to aspects of the disclosure.

FIG. 19 is another example flow diagram according to aspects of the disclosure.

DETAILED DESCRIPTION

Figure 1:
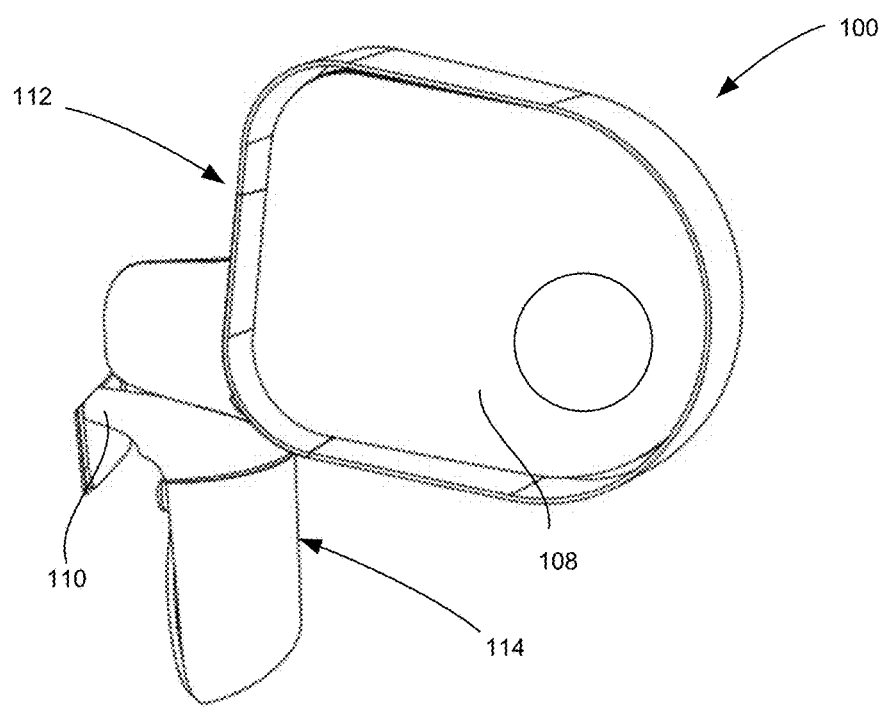
FIG. 1 is a perspective front view of an example side view mirror assembly according to aspects of the disclosure.

Aspects of the disclosure are directed to a removable and adjustable side view mirror assembly for a vehicle. The side view mirror assembly can be used, for example, with autonomous vehicles when it is desired for a human driver to operate the autonomous vehicle. Similarly, such side view mirror assemblies can be used to replace side view mirror assemblies that may have been damaged or removed from a non-autonomous vehicle. One example side view mirror assembly may include a suction cup and bracket assembly that is supported by the windowsill of the door and slides between the window and inside of the exterior door panel. The side view mirror assembly is sturdy and can remain attached to a moving vehicle operating at high speeds. The design of the side view mirror assembly allows for easy mounting and removal without any tools. This provides for a stable mirror structure that can be used with vehicles without permanently modifying the door or the vehicle.

The side view mirror assembly may be comprised of several components. The side view mirror assembly may include a bracket and suction cup subassembly, a rotating mirror arm, and a mirror. An outer housing may be used to conceal some of the components of the mirror assembly. In one example, the outer housing may be comprised of as few as three housing components: an upper housing, a cap housing joined to the upper housing, and a lower housing. The cap housing can be removable to allow a user to access a suction cup pump during installation.

Side view mirror assemblies according to some aspects of the disclosure can provide for easy assembly of the side view mirror onto a vehicle door and minimize costs related to manufacture of the mirror assembly. Additionally, the side view mirror can be designed so that upon impact, the side view mirror can rotate to cause minimal damage to property and pedestrians.

To install the mirror assembly onto a vehicle, mirror arm may be mounted to the bracket of the suction cup and bracket assembly. The bracket may be a u-shaped bracket with one end extending within interior portion of the vehicle door and the other end extending along the exterior surface of the door. A suction cup may be mounted to the window bracket and placed into contact with the vehicle door. A pump may be connected to the suction pump to evacuate air from the suction cup and to securely attach mirror assembly to the door.

Aspects, features and advantages of the disclosure will be appreciated when considered with reference to the following description of embodiments and accompanying figures. The same reference numbers in different drawings may identify the same or similar elements. Furthermore, the following description is not limiting; the scope of the present technology is defined by the appended claims and equivalents. While certain processes in accordance with example embodiments are shown in the figures as occurring in a linear fashion, this is not a requirement unless expressly stated herein. Different processes may be performed in a different order or concurrently. Steps may also be added or omitted unless otherwise stated.

Example Side View Mirror Assembly

Turning to FIG. 1, an example side view mirror assembly 100 is illustrated. Side view mirror assembly 100 is shown fully assembled and is oriented toward the right of a user facing the mirror assembly 100. Mirror assembly 100 can be attached to a vehicle, and more particularly the right side or traditional passenger side of a vehicle, as will be discussed herein. A similar configuration with the mirror oriented towards the left may be used for a left side or traditional driver side of a vehicle. In this example, side view mirror assembly 100 includes a mirror 108 attached to a mounting bracket 110. An upper housing 112 and lower housing 114 conceal the mounting bracket 110 and other interior components of side view mirror assembly 100.

Figure 2:
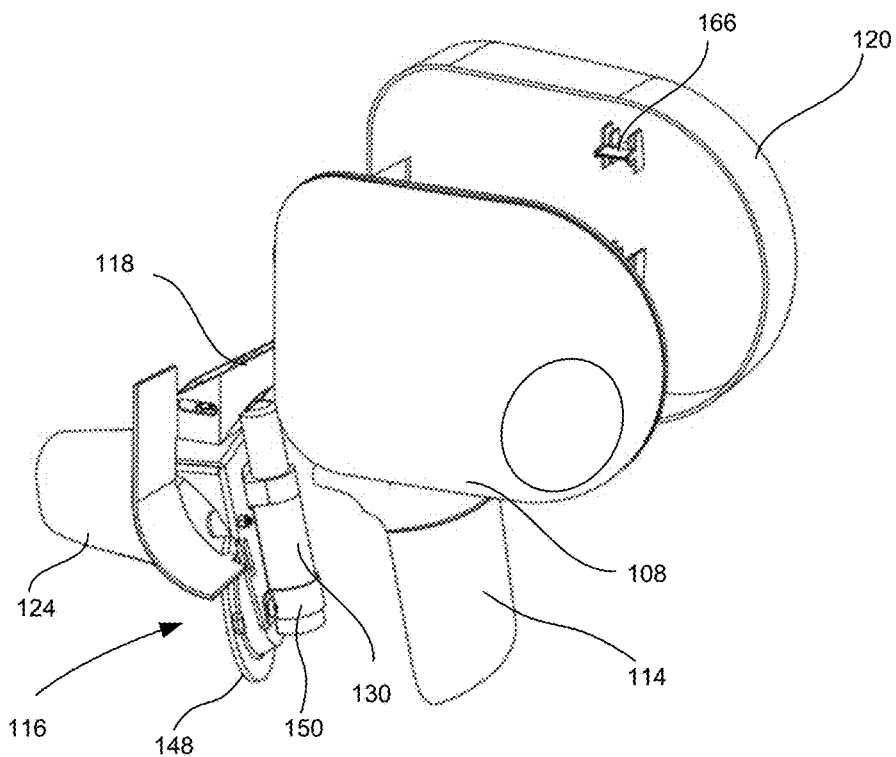
FIG. 2 is an exploded front view of the mirror assembly of FIG. 1.
Figure 3:
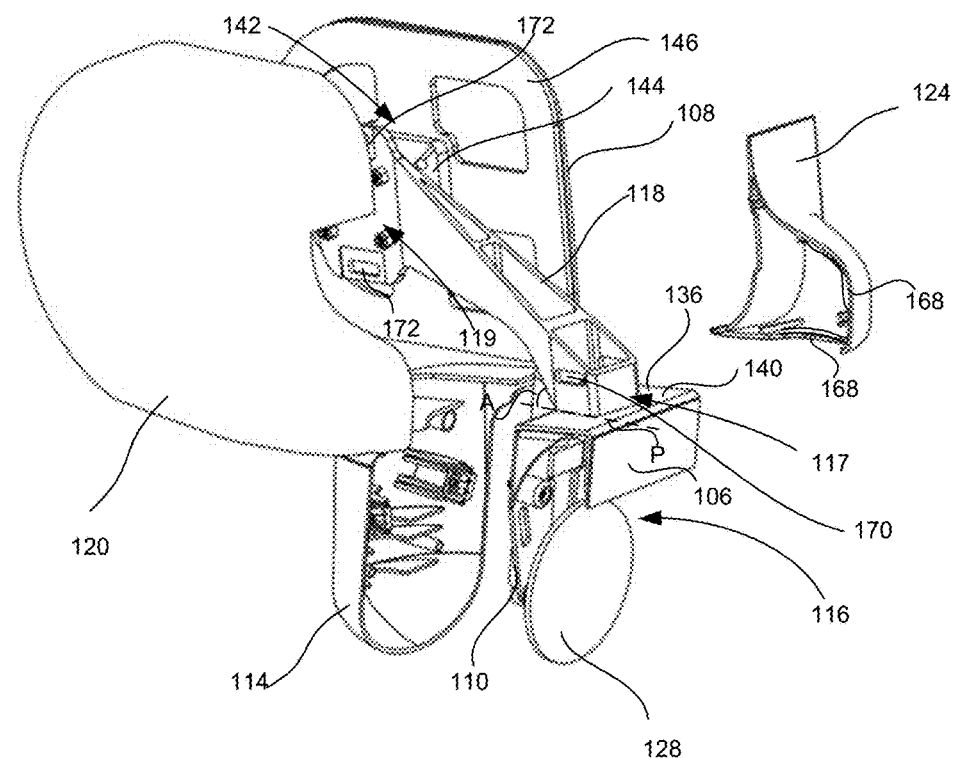
FIG. 3 is an exploded rear view of the mirror assembly of FIG. 1.

FIGS. 2-3 respectively illustrate front and rear exploded views of mirror assembly 100. As shown, mirror assembly 100 further includes a bracket and suction cup assembly 116, which includes mounting bracket 110 and an arm 118 that supports the mirror 108 and mirror adapter plate 146 (FIG. 3.) The upper housing 112 may further include a mirror housing 120 and a cap housing 124. These components will be discussed in greater detail herein.

Figure 4:
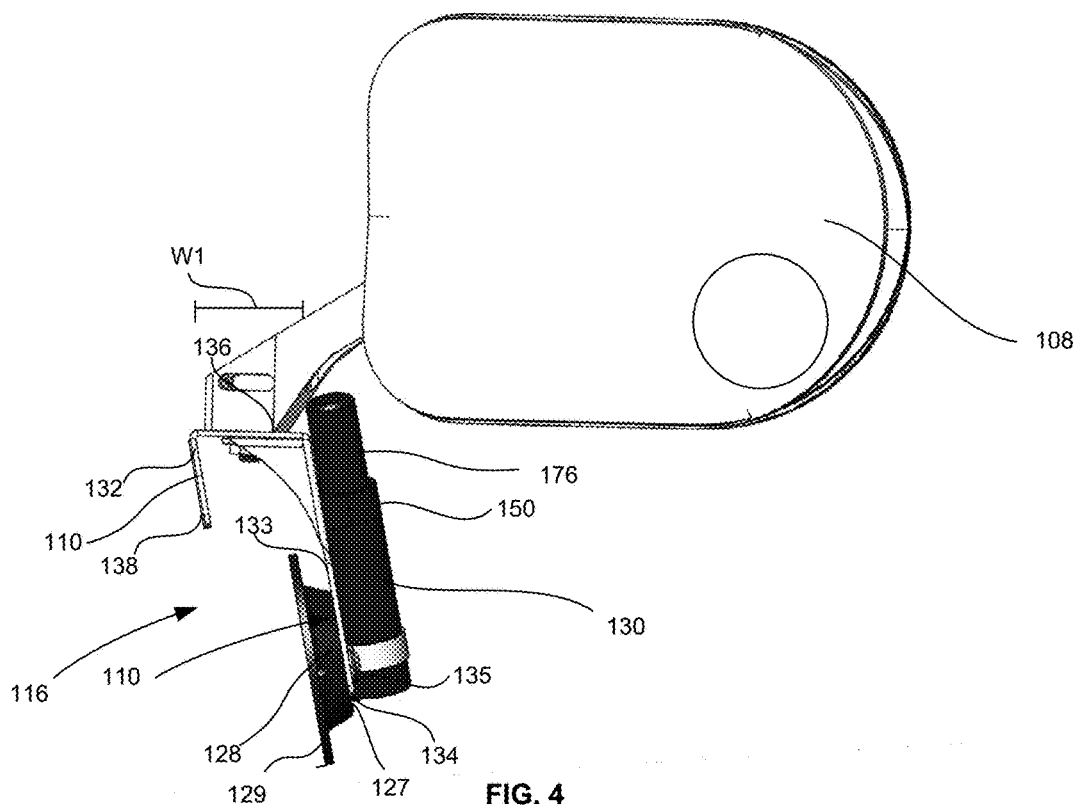
FIG. 4 is a front view of the mirror assembly FIG. 1, with the outer housing removed.

The mounting bracket and suction cup assembly 116 is shown in FIG. 4, a view of the mirror assembly 100 with the upper and lower housings 112,114 removed. Example bracket and suction cup assembly 116 includes a mounting bracket 110 to which a suction cup 128 and pump 130 are attached. Mounting bracket 110 may be a u-shaped bracket including a first leg 132, a second leg 134, and a top panel 136 joining the first and second legs 132,134. The width W1 of top panel 136 can be sized to receive at least a portion of a vehicle door panel, including a vehicle windowsill, between the first leg 132 and second leg 134. Mounting bracket 110 can be comprised of a metal, such as stainless steel, zinced iron, carbon steel, aluminum, and the like. A rigid plastic material, such as a polyvinyl chloride (PVC), a polymer, such as thermoplastic or the like may also be used.

A suction cup 128 may be attached to mounting bracket 110. For example, as shown in FIG. 4, suction cup 128 may be positioned on a lower portion of mounting bracket 110. Suction cup 128 may attach to a smooth, nonporous surface, such as a vehicle door. The suction cup 128 can be a standard off-the-shelf product or can be manufactured for specific characteristics of a particular vehicle or item to which mirror assembly 100 will be attached. In other examples, the bracket need not include the suction cup.

Top surface 127 of suction cup 128 can be attached to interior surface 133 of second leg 134 of mounting bracket 110 using screws or any means to secure suction cup 128 to mounting bracket 110. Connection surface 129 of suction cup 128 is a free or exposed surface that can attach to a surface, such as a vehicle door, during installation of mirror assembly 100 on a vehicle. Suction cup 128 may be an industrial vacuum suction cup 128. Suction cup 128 may be comprised of a weather resistant material suited for the outdoors, such as silicone, butyl, vinyl, ethylene propylene diene monomer (EPDM) rubber and other such materials. Suction cup 128 may have a diameter D ranging, for example from 3 to 10 inches, although other ranges of diameters within our outside of this range may also be used. In one example, diameter D may be 3 inches. Additionally, suction cup 128 may have a capacity to support weight ranging, for example, from at least 5 to 25 pounds. For example, suction cup 128 may have a capacity of 15 pounds. In other examples, suction cup 128 may have the capacity to support weights that may fall within smaller ranges or ranges that fall outside the range of 5 to 25 pounds. Suction cup 128 may be additionally or alternatively coupled to a vacuum pump. In one instance, pump 130 may be coupled to suction cup 128 and exterior surface 135 of mounting bracket 110 using bands 150 that extend across the body of pump 130 and are screwed to mounting bracket 110. Vacuum pump 130 can be a conventional manual vacuum pump that is used to evacuate air from within the suction cup 128. Pump 130 can be configured to evacuate air from a space between a suction cup 128 and the surface to which it is attached, such as a vehicle door. Pump 128 can also be a standard off-the-shelf product or can be manufactured for specific characteristics of a particular vehicle or item to which mirror assembly 100 will be attached.

An arm can be used to join mirror 108 with bracket and suction cup assembly 116. For example, as shown in FIG. 3, arm 118 has a first end 117 and a second end 119. First end 117 is attached to top surface 136 of top panel 140. As shown in FIG. 3, arm 118 may extend at an acute angle A away from a plane P that extends along top panel 140 of mounting bracket 110. Arm 118 may be comprised of a rigid material, such as the same materials that can be used for mounting bracket 110. In one example, arm 118 is a molded plastic arm.

Figure 5:
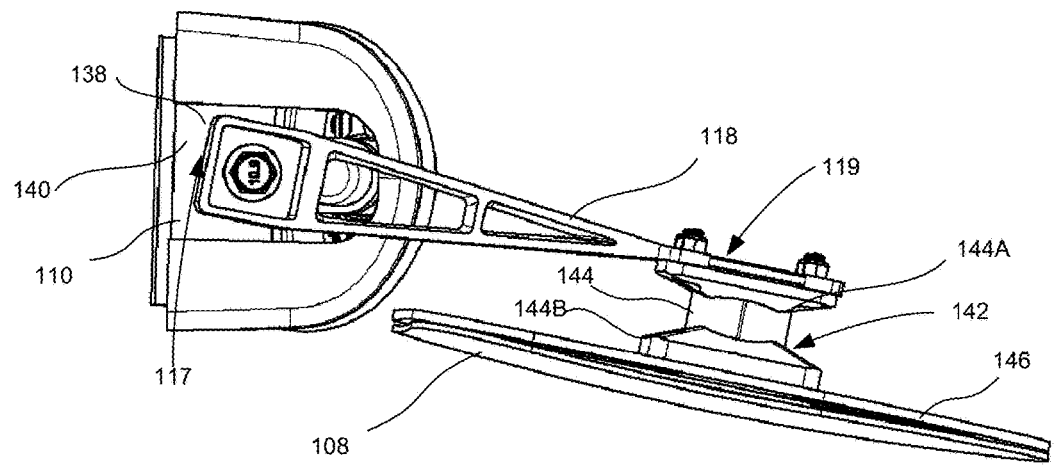
FIG. 5 is a top view of aspects of FIG. 1.

Second end 119 of arm 118 can be attached to mirror 108 and can support the mirror at the appropriate position away from the door. For example, FIG. 5 is a view of the mirror assembly 100 without the upper housing 112. Here, second end 119 of arm 118 attached to a swivel assembly 142 that allows mirror 110 to move about second end of arm. Swivel assembly 142 can include a swivel 144 and an adapter plate 146 (see also FIG. 3) to which mirror 108 is attached.

Swivel 144 can be comprised of known mechanisms that permit rotation of swivel 144 while fixed to second end 119 of arm 118. In this instance, swivel 144 may include a first swivel plate 144A and a second swivel plate 144B with ball bearings therebetween to permit movement of swivel plate 144B relative to first swivel plate 144A. For example, swivel 144 can allow for rotational movement about the x and y axis. In other examples, second end 119 of arm 118 can instead directly attach to mirror 108 or adapter plate 146, such that mirror 108 is not capable of rotating relative to arm 118.

The interior components of mirror assembly 100 can be concealed in housing components. As noted above, mirror assembly 100 includes a lower housing 114 and an upper housing 112, which is comprised of mirror housing 120 and cap housing 124 joined together. As shown in FIGS. 2-3, mirror housing 120 and cap housing 124 include portions that are complementary to one another. Mirror housing 120 can be used to conceal the arm 118, adapter plate 146 and swivel assembly 142. Lower housing 114 can be used to conceal pump 130 and mounting bracket 110. Cap housing 124 can be used to conceal the lower portion of arm 118 and pump tip 176 of pump 130.

Figure 6:
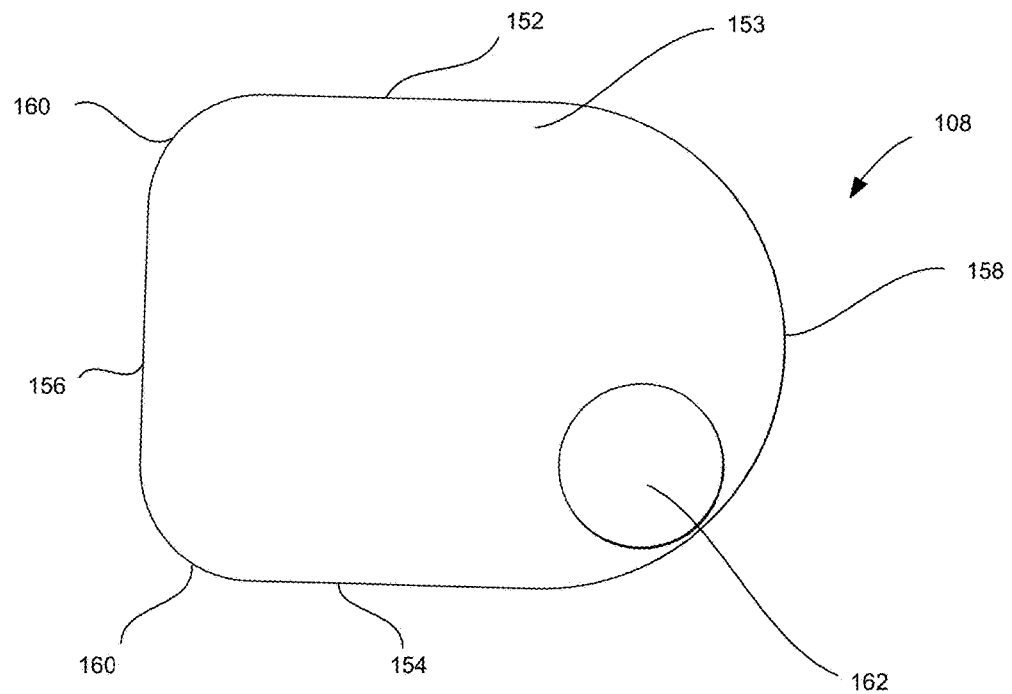
FIG. 6 is a front view of a mirror of the mirror assembly of FIG. 1.

Conventional mirrors of any shape and size can be used with mirror assembly 100. For example, as shown in FIG. 6, a mirror 108 has a top surface 152 and a bottom surface 154. At one end, a first edge surface 156 joins top surface 152 and bottom surface 154 together with rounded edges 160. The other end can be joined together by a rounded second edge surface 158. When the mirror 108 is used for a passenger-side mirror, such as shown in FIG. 6, the face 153 of the mirror 108 may be convex. Objects appearing in the convex face of the mirror will be closer than they appear. The mirror face 153 may alternatively be concave, flat, or any other desired shape. A secondary convex mirror 162 may also be provided in a lower corner adjacent second edge surface 158 for increased range of viewing.

Figure 7:
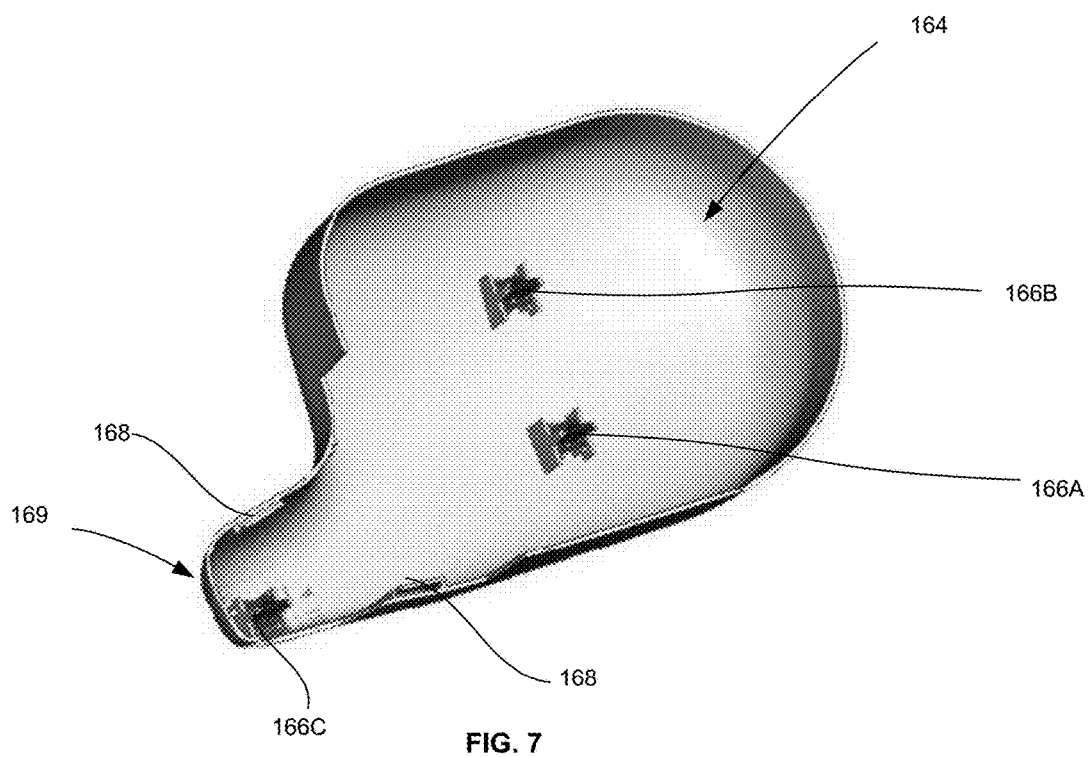
FIG. 7 is a perspective front view of a mirror housing of the mirror assembly of FIG. 1.

The mirror housing 120 may be configured in any number of shapes capable of housing mirror 108. For example, as shown in FIG. 7, mirror housing 120 includes a recess 164 for receiving mirror 108, swivel assembly 142, and at least a portion of arm 118. As shown, the overall shape of mirror housing 120 closely follows the shape of mirror 108. In other examples, mirror housing 120 may be significantly larger than the mirror, include additional details, etc.

Mirror housing 120 can be directly attached to second arm 118. In one instance, clips can be used to form a direct and secure connection with arm 118. For example, clip 166C (FIG. 6) can join with slot 170 (FIG. 3) in arm 118. Similarly, clips 166A, 166B can join with slots 172 (FIG. 3) at second end of arm.

Mirror housing 120 may further include magnets. For example, magnets 168 may be arranged within mirror housing 120 adjacent a lower corner region 169 of mirror housing 120, as shown in FIG. 7. Magnets 168 can be used to secure cap housing 124 and mirror housing 120 together, as discussed herein.

Figure 8:
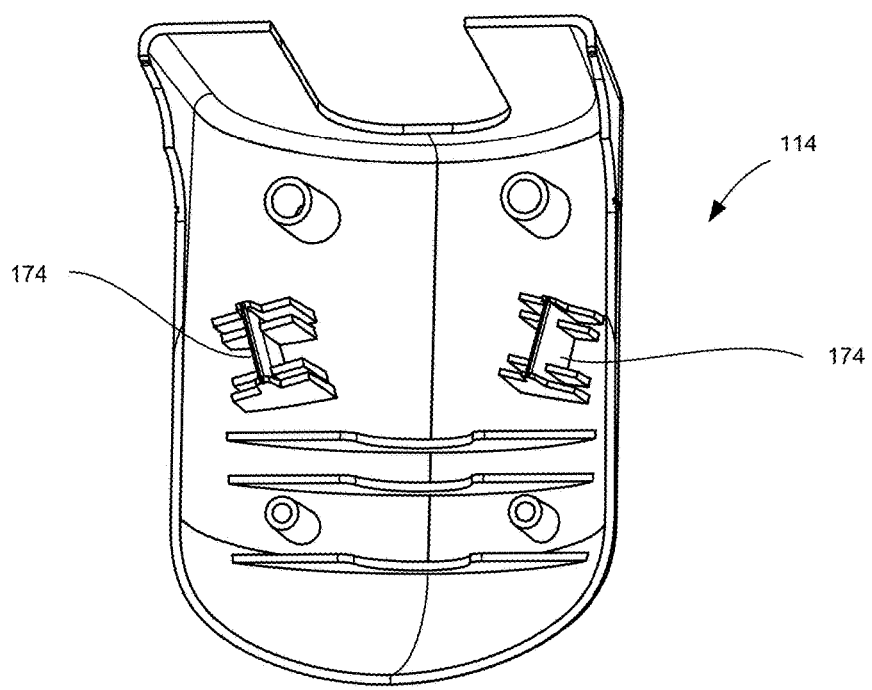
FIG. 8 is a front view of a lower housing of the mirror assembly of FIG. 1.

Lower housing 114 can be used to conceal bracket and suction cup assembly 116. For example, as shown in FIG. 8, lower housing 114 is elongated and sized to accommodate bracket and suction cup assembly 116. Lower housing 114 can also include a mechanism for securing lower housing 114 to bracket and suction cup assembly 116, such as clips 174 that can mate with bracket and suction cup assembly 116.

Cap housing 124 can be used to conceal a portion of arm 118 and a top portion of bracket and suction cup assembly 116. For example, with reference back to FIG. 2, cap housing 124 can be used to conceal arm 118 and pump tip 176 of pump 130. Cap housing 124 includes magnets 168A, 168B (FIG. 3) that can be joined with magnets 168 (FIG. 7) in mirror housing 120.

The size and shape and materials used for each of the housings can vary. For example, any one of the housings disclosed herein may be comprised of various materials, including, without limitation, polymers/plastic, such as polyvinyl chloride (PVC), composites, or metals. Additionally, such materials may be UV stable, painted, or textured. For example, although not required, the selected material can include an ultraviolet light stabilizer, which can enhance the ability of a material to withstand extreme temperatures. The housing can be shaped into any form according to various methods, such as by injection molding or casting urethane parts.

Figure 9:
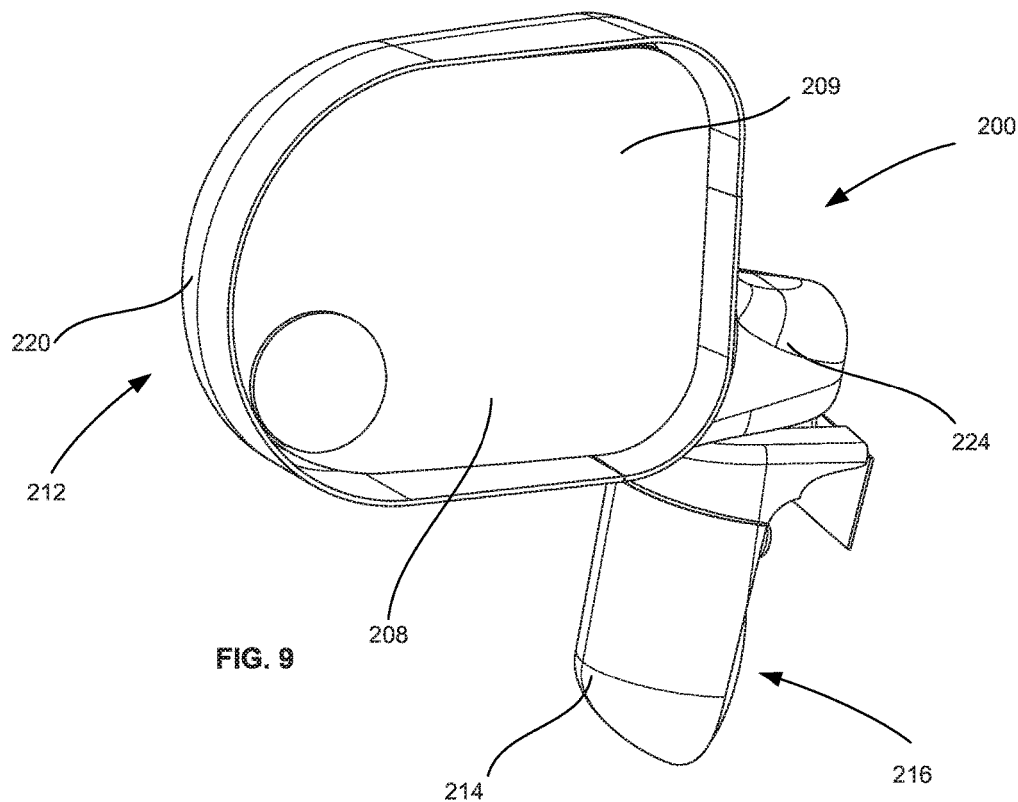
FIG. 9 is a perspective front view of another example side view mirror assembly according to aspects of the disclosure.

In another example, the removable side view mirror assembly 200 can be configured so that it can be positioned on the traditional driver side of a vehicle or a left side of a vehicle. For example, mirror assembly 200 shown in FIG. 9 is an example mirror assembly that can be used on the traditional driver side or left side of a vehicle assembly, when facing the rear of the vehicle. Mirror assembly 200 includes bracket and suction cup assembly 216, an upper housing 212 that houses mirror 208, and a lower housing 214.

Figure 10:
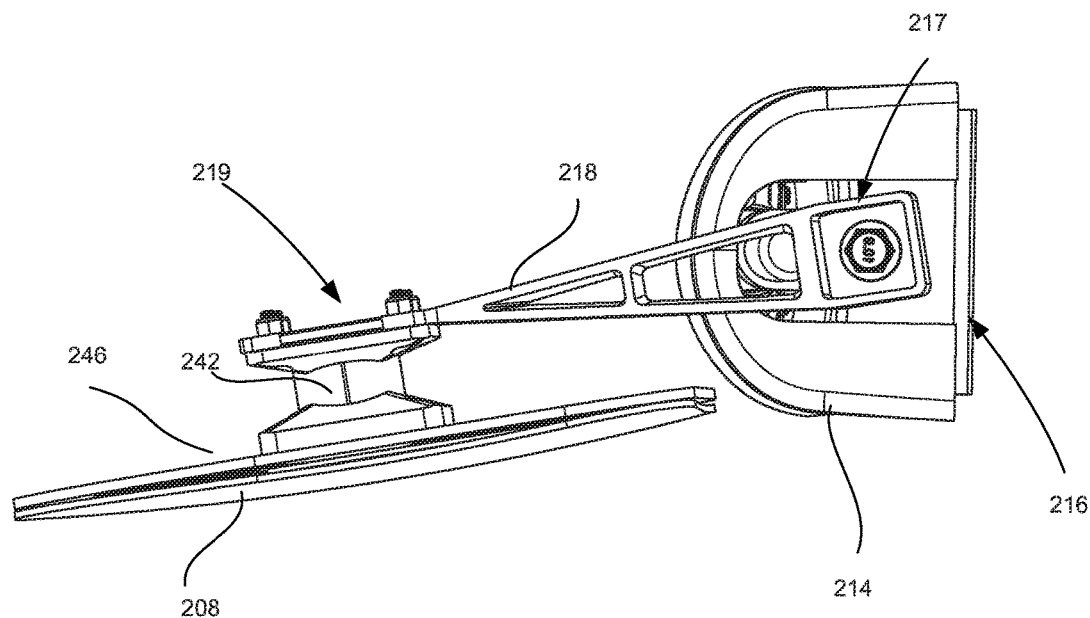
FIG. 10 is a top plan view of aspects of FIG. 9.

Mirror assembly 200 can differ from mirror assembly 100 with respect to those components that must be either oriented to be positioned on the left hand side of a vehicle or manufactured so that the feature can be positioned on the left hand side of a vehicle. Additionally, the face 209 of the mirror 208 can be planar or flat to provide the driver with the ability to more accurately determine the location of objects appearing in the mirror, although other surfaces, such as concave or convex surfaces, can also be utilized. For example, FIG. 10 illustrates a top view of mirror assembly 100 without mirror housing 220 and cap housing 224. As shown, first end 217 of arm 218 is connected with bracket and suction cup assembly 216 and the second end 219 of arm 218 is connected with swivel assembly 242, adapter plate 246, and mirror 208. Lower housing 214 conceals bracket and suction cup assembly 216. Each of these components is similar to those components discussed with regard to FIGS. 1-9, except that during assembly, several components can be oriented to face toward the left or an opposite orientation of mirror assembly 100 and the mirror surface 209 can be flat. These components can therefore be used with mirror assemblies that are intended to be installed on either the left side or right side of a vehicle. The ability to interchangeably use these components to assemble a mirror assembly 200 for either the right side or left side of a vehicle simplifies the assembly process and cuts down on costs required to machine additional parts specific to one side of the vehicle.

The upper housing 212 may be the only component that requires separate manufacture to accommodate a specific mirror assembly 200 orientation. In this example, upper housing 212 can be comprised of mirror housing 220 and cap housing 224. Mirror assembly 200 is not symmetric and requires an opening in the lower right hand corner to accommodate cap housing 224. Similarly, cap housing 224 is not symmetric and does not lend itself to being interchangeably used with both right and left mirror assemblies.

While certain aspects of the disclosure are particularly useful in connection with specific types of vehicles, the vehicle assembly may be any type of vehicle assembly including, but not limited to, cars, trucks, motorcycles, busses, recreational vehicles, etc. Turning now to FIG. 10, an example vehicle assembly 280 with a removable mirror assembly 200 is shown. As can be seen, vehicle assembly 280 includes many features of a typical vehicle such as headlights 282, windshield 283, taillights/turn signal lights, rear windshield 284, doors 286, tires and wheels 288, and turn signal/parking lights 290. In this example, vehicle assembly 280 is an autonomous vehicle, such as a vehicle that does not require a human driver and can be used to aid in the transport of passengers or items from one location to another. Such vehicle may operate in a fully autonomous mode where passengers may provide some initial input, such as a destination, and the vehicle maneuvers itself to that destination. In other examples, vehicle assembly 280 may require a human driver, such as in semi-autonomous mode.

Figure 11:
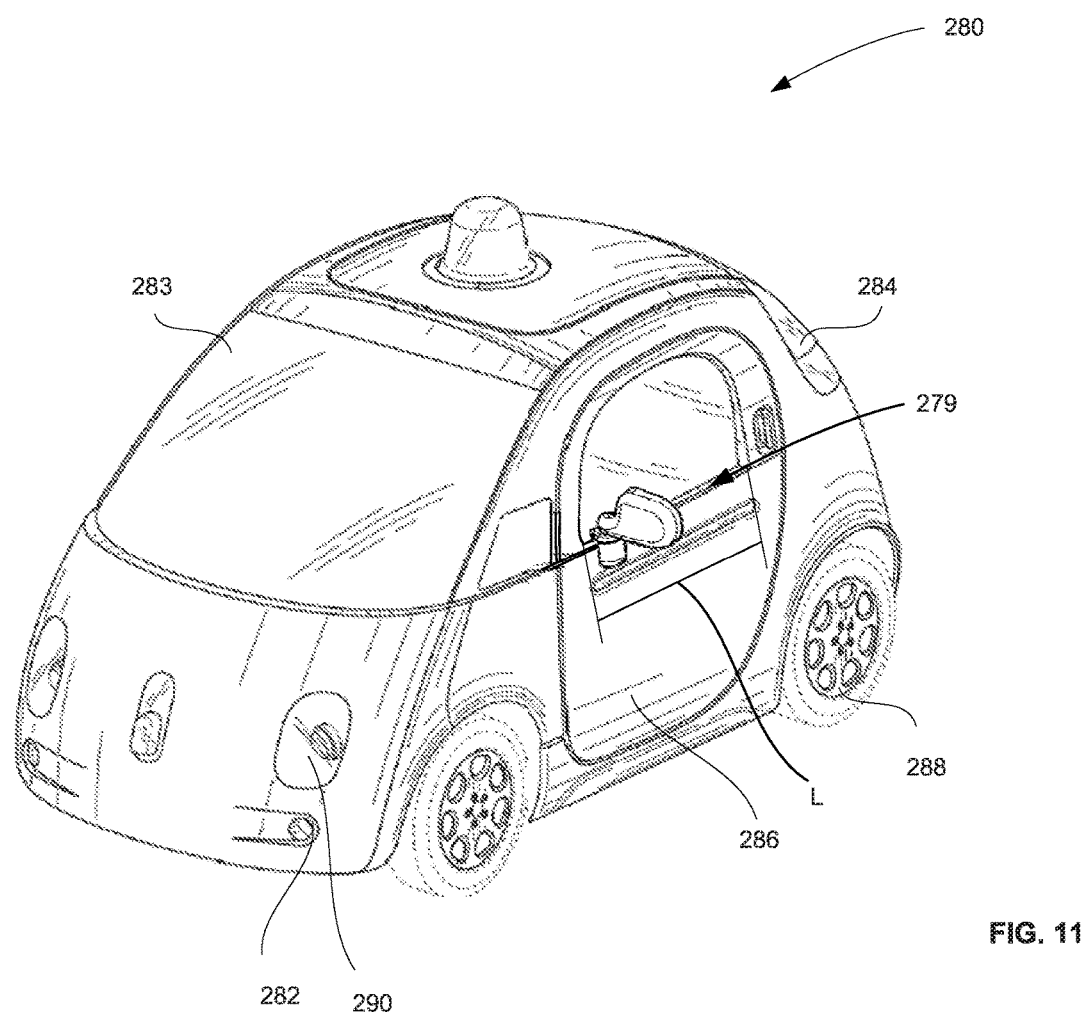
FIG. 11 is an example external view of a vehicle according to aspects of the disclosure.

As shown in FIG. 11, a mirror assembly 200 may be attached to the door of vehicle assembly 280, such as the mirror assembly 200 disclosed herein. Mirror assembly 200 can be positioned over windowsill 279 and closer toward the windshield 283. Mirror assembly 200 may be positioned anywhere along the length L of windowsill 279.

In other examples, mirror assembly 200 may also be used in connection with non-autonomous vehicles. Non-autonomous vehicles are traditional vehicles that require a human driver to operate all functions of the car, such as when to stop and start, the speed of the car, etc.

Method of Installing Removable Mirror Assembly

A removable side view mirror assembly, as discussed herein, may be secured onto a vehicle assembly. In one example, a fully assembled removable side view mirror assembly is obtained based upon whether the side view mirror assembly is intended to be installed on the right side or left side of the vehicle. Cap housing can be removed away from the mirror assembly to expose the pump tip of the pump. The bracket may be positioned onto the windowsill of the vehicle door. In a particular example, the first leg of the bracket is positioned between the outer inner edge of vehicle door and the outer surface of the vehicle window. In this regard, positioning the first leg within the interior surface of the vehicle door does not interfere with operation of the window and the window freely opens and closes while the mirror assembly is attached to the vehicle door. The felt on the bracket further prevents the bracket from scratching the glass of the vehicle window. The second leg of the bracket includes a surface facing the exterior surface of the vehicle.

A suction cup attached to the bracket can also be attached to the vehicle to further secure the bracket to the vehicle. Pressure applied to the suction cup forms a connection between the suction cup and vehicle door. Furthermore, a pump associated with the suction cup can be used to evacuate air from within the space between the suction cup and the vehicle assembly. A pump can be manually pumped until the appropriate level of vacuum has been obtained. Once the appropriate vacuum has been achieved, the mirror assembly is secured to the vehicle. The cap housing can be put back into place to complete the mirror assembly. To further adjust the mirror assembly, a user can push on one of the four corners of the mirror to move mirror into an appropriate or desired position for the driver of the vehicle.

Figure 12:
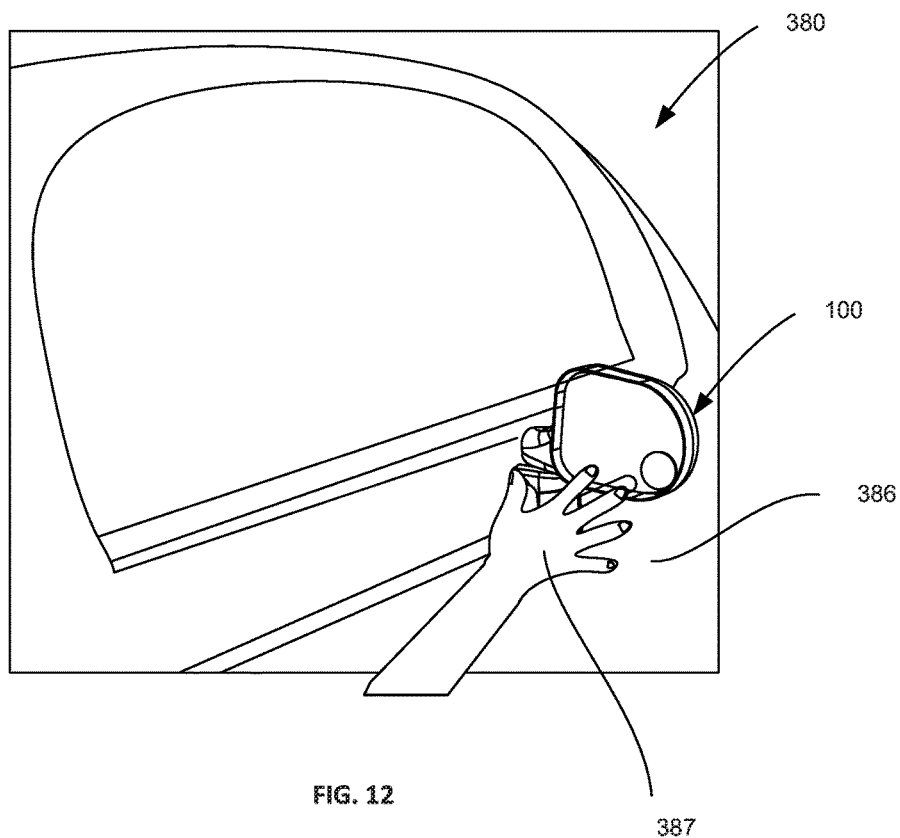
FIG. 12 is an example external view of an example side view mirror assembly prior to installation on a vehicle, according to aspects of the disclosure.

Turning to FIGS. 12-15, a method for assembling a side view mirror assembly 100 onto a vehicle is illustrated. With reference to FIG. 12, a completed side view mirror assembly 100 is shown in the hand 387 of a user prior to being mounted to the door 386 of a vehicle assembly 380. As noted above, mirror assembly 100 is intended to be installed on the right side or traditional passenger side of a vehicle.

Figure 13:
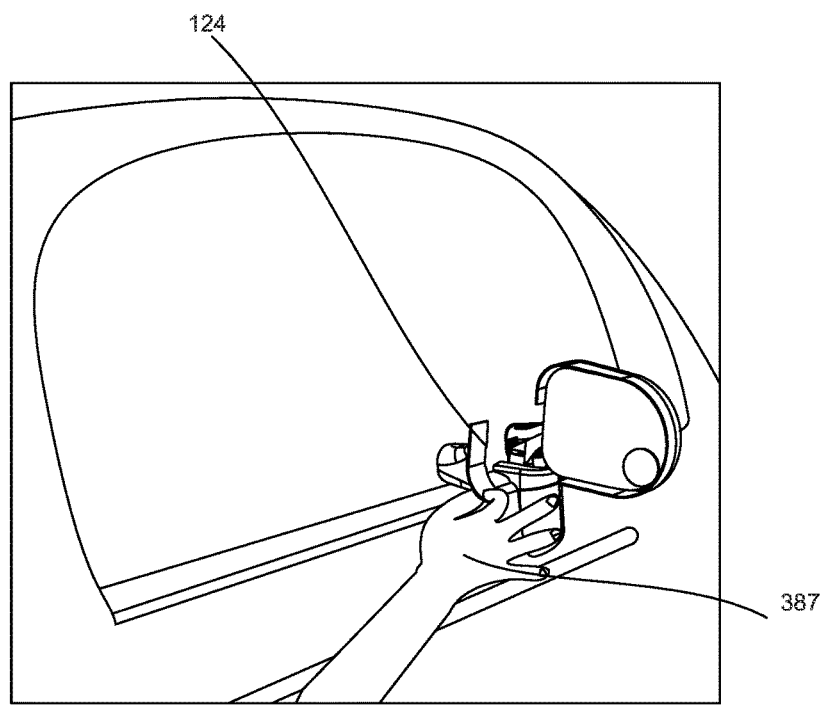
FIG. 13 is an example view of removing a portion of side view mirror assembly, according to aspects of the disclosure.

The cap housing 124 of mirror assembly 100 can be removed. For example, as shown in FIG. 13, using hand 387, a user may grasp the edge of cap housing 124 and pull cap housing 124 away from the remainder of mirror assembly 100. As discussed above, cap housing 124 can be joined to mirror housing 120 by magnets 168 (FIG. 3) on cap housing 124 that join with magnets 168A,168B (FIG. 7) in mirror housing 120. This allows for a secure attachment between mirror housing 120 and cap housing 124, while also allowing for easy removal by a user. Although in this example the cap housing 124 is removed prior to positioning the mirror assembly 100 on the vehicle door, it is to be understood that the cap housing 124 can alternatively be removed after the mirror assembly 100 is positioned onto the vehicle door, as will be discussed below.

Figure 14:
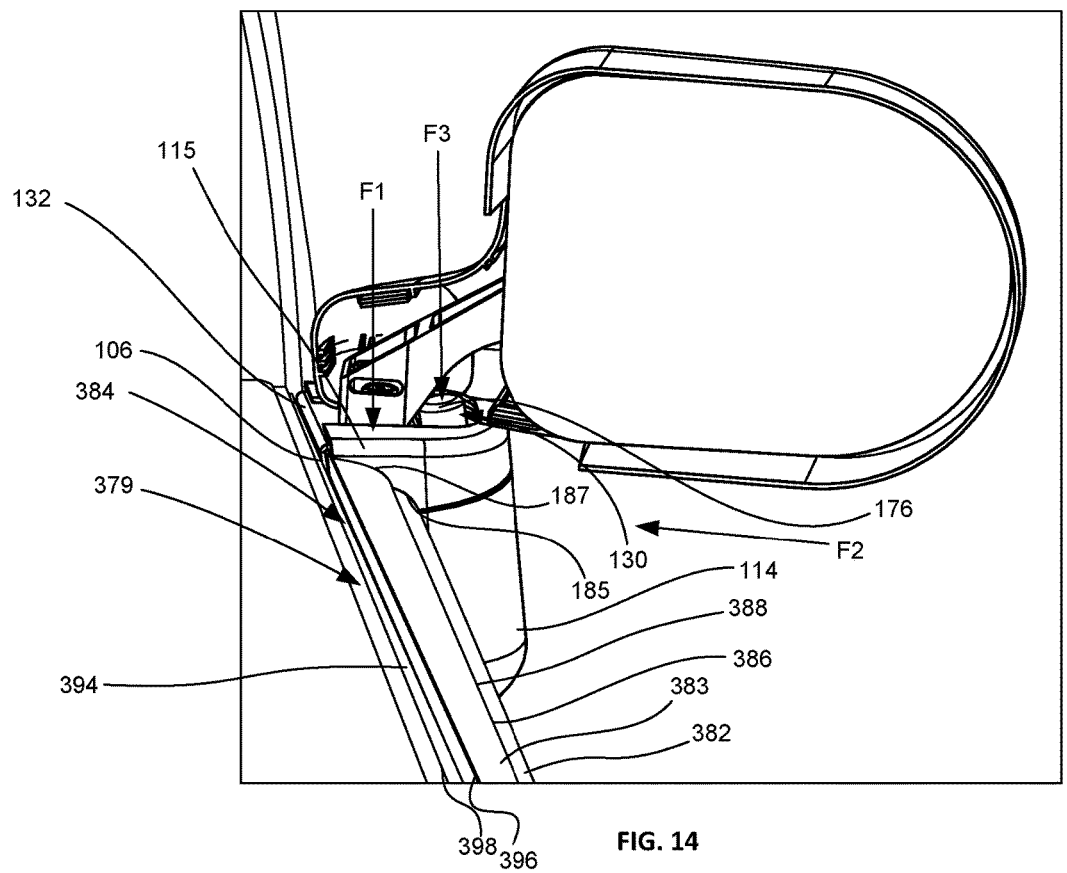
FIG. 14 is an example view of a mirror assembly installed on a windowsill of a vehicle door, according to aspects of the disclosure.

The mirror assembly 100 can be positioned onto the vehicle assembly. For example, as shown in FIG. 14, mirror assembly 100 can be connected to the windowsill 379 of vehicle door 386 of vehicle assembly 380. In this example, for ease of assembly, window 394 is in a fully open position, where the interior space of vehicle assembly is open to the environment. In other examples, window 394 can also be in a closed position where the interior space of vehicle assembly is not open to the environment. The first leg 132 of bracket 110 can be positioned over the windowsill 379 of vehicle assembly. First leg 132 is further inserted into the opening 384 of the windowsill 379 between the first interior surface and second interior surface of vehicle door 386. In this example, first interior surface 396 is closest to the outer environment and second interior surface 397 is closest to the interior of the vehicle assembly 380. First leg 132 can be further positioned between the vehicle window 394 and first interior surface 396 of vehicle door 386. Felt 106 on first leg 132 can rest adjacent vehicle window 394, thereby permitting window 394 to move from an open position to a closed position.

The mirror assembly 100 can be secured to a vehicle door 386. For example, a user may apply a force in the direction of arrow F1 on the top surface 115 of lower housing 114 to ensure that mirror assembly 100 is flush with surfaces 388 of vehicle door 386. In one instance, mirror assembly 100 may be positioned relative to door 386 so that the shape of the lower housing 114 of mirror assembly 100 coincides with the shape of the vehicle door 386. For example, as shown, vehicle door 386 includes curves 382,383. Lower housing 114 can be configured to include complementary curves 185,187 that can respectively complement the curves 382,383 of vehicle door 386. In other examples, lower housing 114 of mirror assembly 100 can be configured to conform to any shape of vehicle door 386 or lower housing 114 may not conform to the shape of the vehicle door or other component of vehicle assembly 380.

Mirror assembly 100 can be additionally or alternatively secured to the vehicle door 386 by the suction cup 128. To ensure a secure connection, a user may apply a pressing force in the direction of arrow F2 onto the lower housing 114 to form a secure bond between suction cup 128 and vehicle door 386. Additionally, or alternatively, with cap housing 124 temporarily removed, pump tip 176 of pump 130 is exposed to provide a user with access to pump tip 176. A user can apply a series of forces in the direction of arrow F3 to pump tip 176 to activate pump 130 and evacuate air from the space between the suction cup 128 and vehicle door 386. In one instance, a user can continually pump the pump tip 176 until mirror assembly 100 forms a strong connection with vehicle door 386.

Figure 15:
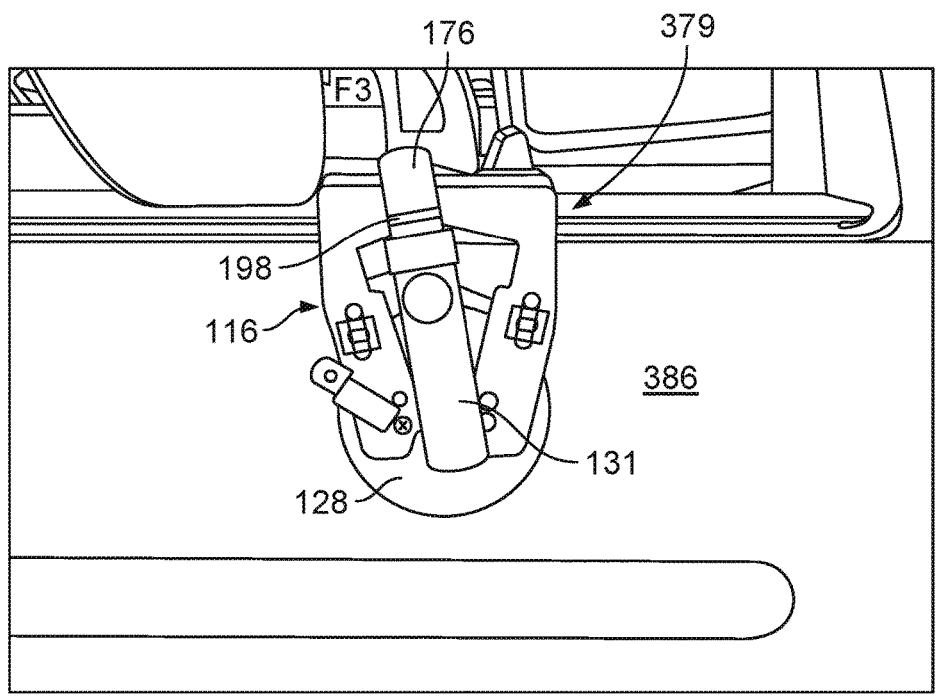
FIG. 15 is in example view of aspects of mirror assembly attached to a vehicle door.

FIG. 15, is a view of mirror assembly 100 attached to vehicle assembly without the upper and lower housings 112,114, respectively, to better illustrate the features of pump body 131, suction cup 128 and pump tip 176. A user can continually pump the pump tip 176 until the indicator line 198 on pump tip 176 is no longer visible. The absence of a visible indicator line 198 can indicate that all excess air has been evacuated from between the suction cup 128 and vehicle door 386, and that the user may discontinue applying force F3 to pump tip 176.

Figure 16:
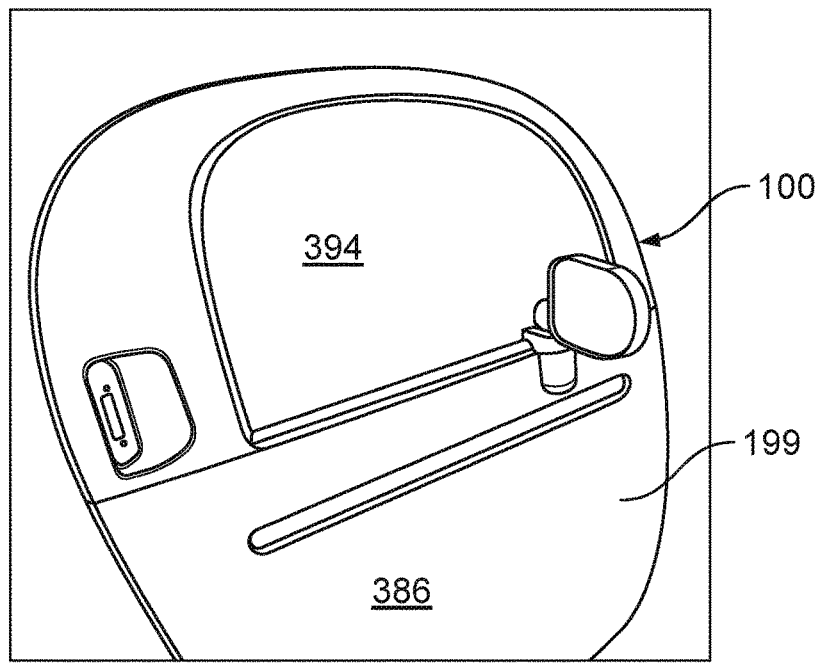
FIGS. 16 and 17 are perspective front and rear view of a side view mirror assembly positioned on a vehicle assembly.
Figure 17:
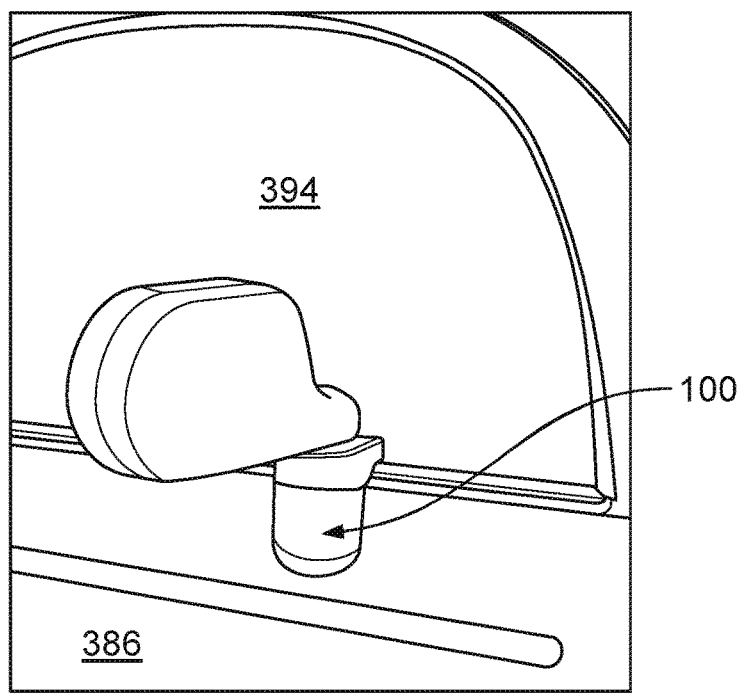

Cap housing 124 can then be re-joined with mirror housing 120 to form the completed mirror assembly 100. For example, as shown in FIGS. 16 and 17, a completed mirror assembly 100 installed on vehicle assembly door 386 is shown. Mirror assembly 100 is shown positioned toward a front corner end of window 194, although the mirror may be adjusted at any point along the windowsill of window 194. As shown, mirror assembly 100 may be positioned between window 194 and outer surface 199 of vehicle door 386. In examples where the pump is not required or activated, the cap housing 124 does not need to be removed during assembly, since access to the pump tip 176 by a user is not required. In addition, a similar method may be used to install a mirror oriented on the traditional driver side of the vehicle or the left side of the vehicle when facing the rear of the vehicle.

FIG. 18 is a flow diagram illustrating an example method 500 for assembling a mirror assembly 100, such as a mirror assembly having all or some of the features of mirror assembly 100, onto a vehicle. At block 512, a user may position a removable mirror assembly 100 onto the windowsill of a vehicle door. At block 514, a user may position at least a portion of the mirror assembly into the interior portion of the vehicle door. For example, as discussed herein, a user may position a leg of a bracket of the mirror assembly into the interior portion of the vehicle door.

FIG. 19 illustrates an example flow chart 600 for assembling a mirror assembly, such as a mirror assembly 100 having all or some of the features of mirror assembly 100 onto a vehicle. At block 610, a user removes a portion of a mirror assembly 100 to expose a pump tip that is coupled to a securing mechanism, such as suction cup 128. For example, as previously discussed, a portion of the mirror housing 120 may be magnetically attached to cap housing 124. The cap housing 124 may be removed away from mirror housing 120, such that removal of the portion exposes the pump tip and provides the user with access to the pump tip.

At block 612, the mirror assembly 100 is positioned onto the vehicle door. For example, the mirror assembly 100 may include a bracket that can be positioned onto the vehicle door, such as a bracket that has all or some of the features of bracket 110. The bracket may include legs that are positioned within the window opening of the vehicle assembly.

At block 614, the pump can be actuated until a majority of the air is evacuated from the space between the securing mechanism and the vehicle door. For example, the pump may include a pump tip that a user can continually depress until the user receives an indication that all excess air has been evacuated.

At block 616, the removably attached portion of the mirror assembly may be joined with the remainder of the housing. For example, the cap housing 124 may be aligned and then joined with the remainder of the mirror housing 100.

In the examples discussed above, relative positions such as upper, lower, top, bottom, right, left, lateral, longitudinal, horizontal, vertical, and the like are used for reference only and are not intended to be limiting with respect to particular positions of the elements they are used to describe. Additionally, while particular methods are described and shown in a specific order in the appended drawings, such methods are not limited to any particular order unless such order is expressly set forth herein. Furthermore, additional steps may be added and one or more disclosed steps omitted.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A system comprising:
    a side view mirror assembly, the side view mirror assembly comprising;
        a bracket having a first leg, a second leg, and a panel joining the first leg and the second leg, the bracket being sized to receive at least a portion of a windowsill of a vehicle between the first leg and the second leg, the second leg having a first surface oriented towards the first leg and a second surface opposite of the first surface and the second surface being oriented away from the first leg,
        a suction cup mounted to the first surface of the second leg,
        a pump mounted on the second surface such that when in operation the pump is arranged to evacuate air from the space between the suction cup and a surface of the vehicle secure the mirror assembly to the surface of the vehicle, and
        a mirror surface connected via an arm to the panel.

2. The system of claim 1, wherein the second leg is longer than the first leg.

3. The system of claim 2, wherein the first leg has a first edge arranged farthest from the panel, and the suction cup is mounted to the second leg below the first edge.

4. The system of claim 1, wherein the first leg includes a third surface and a fourth surface opposite the third surface, the fourth surface being oriented towards the first surface, and the assembly further comprises a material attached to the third surface, so as to reduce a likelihood of damage to a surface which contacts the material.

5. The side view mirror assembly of claim 1, wherein the arm extends away from the panel and supports the mirror surface.

6. The system of claim 1, further comprising the vehicle.

7. The system of claim 6, wherein the surface of the vehicle corresponds to an exterior surface of a door panel of the vehicle.

8. The system of claim 1, wherein the bracket is a U-shaped bracket.

9. The system of claim 1, wherein the side view mirror assembly further comprises a first housing and a second housing that together house the second leg.

10. The system of claim 9, wherein the first housing is arranged to conceal the second surface of the second leg.

11. The system of claim 9, wherein the second housing is arranged to conceal a portion of the arm and a top portion of the bracket.

12. The system of claim 9, wherein the second housing is arranged to conceal a pump tip of the pump, wherein the pump tip is arranged such that actuation of the pump tip causes the pump to evacuate the air.

13. The system of claim 12, wherein the second housing is arranged to be removable from the side view mirror assembly in order to expose the pump tip and thereby allow for operation of the pump tip.

14. The system of claim 12, wherein the side view mirror assembly further comprises a mirror housing including a first set of magnets, and the second housing includes a second set of magnets, the first set of magnets and the second set of magnets being configured to hold the second housing to the first mirror housing such that the second housing is removable from side view mirror assembly in order to expose the pump tip and thereby allow for operation of the pump tip.

15. The system of claim 12, wherein the side view mirror assembly further comprises a mirror housing arranged with the second housing to conceal the arm.

16. A method for installing a side view mirror assembly to a vehicle door, the assembly including a bracket having a first leg, a second leg, and a panel joining the first leg and the second leg, the bracket being sized to receive at least a portion of a windowsill of a vehicle between the first leg and the second leg, the second leg having a first surface oriented towards the first leg and a second surface opposite of the first surface and the second surface being oriented away from the first leg, the assembly further including a suction cup mounted to the first surface of the second leg and a pump mounted on the second surface, the method comprising:
    positioning the first leg within an opening of the windowsill of the vehicle door and the second leg of the mounting bracket on an exterior surface of the vehicle door such that the suction cup is oriented towards the exterior surface;
    using the pump to evacuate air from between the suction cup and the exterior surface in order to install the mirror of the mirror assembly to the windowsill of a vehicle door without tools and
    securing the suction cup to the vehicle door, such that the mirror assembly remains in place when the vehicle is in motion.

17. The method of claim 16, further comprising releasing the suction cup from the door in order to remove the mirror assembly from the door without causing damage to the vehicle.

18. The method of claim 16, wherein the side view mirror assembly further comprises a mirror surface connected via an arm to the panel and a removable housing arranged to conceal a portion of the arm, and wherein the method further comprises removing the removable housing prior to using the pump.

19. The method of claim 18, wherein removing the housing exposes a pump tip of the pump and using the pump includes depressing the pump tip.

20. The method of claim 19, further comprising, after using the pump, attaching the removable housing to the side view mirror assembly.

* * * * *